(12) United States Patent
Ravazzoni et al.

(10) Patent No.: US 9,126,746 B2
(45) Date of Patent: Sep. 8, 2015

(54) ADAPTOR FOR SPRAY CANS

(75) Inventors: Flavio Ravazzoni, Milan (IT); Michele Porcelli, Milan (IT)

(73) Assignee: SILVER S.N.C., Milan (IT)

( * ) Notice: Subject to any disclaimer, the term of this patent is extended or adjusted under 35 U.S.C. 154(b) by 409 days.

(21) Appl. No.: 13/563,801

(22) Filed: Aug. 1, 2012

(65) Prior Publication Data

US 2013/0206869 A1 Aug. 15, 2013

(30) Foreign Application Priority Data

Feb. 15, 2012 (IT) .............................. MI2012A0212

(51) Int. Cl.

| | |
|---|---|
| *B05B 1/12* | (2006.01) |
| *B65D 83/30* | (2006.01) |
| *B05B 1/16* | (2006.01) |
| *B05B 11/00* | (2006.01) |
| *B05B 15/06* | (2006.01) |
| *B65D 83/20* | (2006.01) |
| *F16N 3/06* | (2006.01) |
| *F16N 21/04* | (2006.01) |
| *F16N 25/00* | (2006.01) |

(52) U.S. Cl.
CPC ................ *B65D 83/30* (2013.01); *B05B 1/169* (2013.01); *B05B 1/1645* (2013.01); *B05B 11/0029* (2013.01); *B05B 15/069* (2013.01); *B65D 83/205* (2013.01); *B65D 83/207* (2013.01); *B65D 83/303* (2013.01); *F16N 3/06* (2013.01); *F16N 21/04* (2013.01); *F16N 25/00* (2013.01)

(58) Field of Classification Search
CPC ........ B05B 15/00; B05B 1/1645; B05B 1/12; B05B 7/2408; B65D 83/206; B65D 83/30
USPC .......... 239/390, 397, 391, 392–396, 442, 548
See application file for complete search history.

(56) References Cited

U.S. PATENT DOCUMENTS

| | | | | |
|---|---|---|---|---|
| 3,269,608 | A | * | 8/1966 | Weber, III ...................... 222/180 |
| 3,703,994 | A | * | 11/1972 | Nigro ............................. 239/397 |
| 3,711,030 | A | * | 1/1973 | Jones ............................. 239/397 |
| 3,795,366 | A | * | 3/1974 | McGhie et al. ................ 239/397 |
| 5,253,807 | A | * | 10/1993 | Newbegin ........................ 239/11 |
| 5,385,303 | A | | 1/1995 | Gosselin et al. |
| 6,328,185 | B1 | * | 12/2001 | Stern et al. .................. 222/402.1 |
| 8,276,832 | B2 | * | 10/2012 | Nelson et al. ................. 239/391 |

FOREIGN PATENT DOCUMENTS

| | | |
|---|---|---|
| DE | 102005037068 A1 | 9/2006 |
| JP | 10014949 | 1/1998 |

* cited by examiner

*Primary Examiner* — Arthur O Hall
*Assistant Examiner* — Chee-Chong Lee
(74) *Attorney, Agent, or Firm* — Robert E. Alderson, Jr.

(57) ABSTRACT

Adaptors for spray cans are provided. Such adaptors may include a body which may be positioned on the neck of a can and an actuator for operating the dispenser nozzle of the spray can, and a plurality of nozzle-holders, each of which can be joined to a nozzle for dispensing to a mechanical instrument.

14 Claims, 6 Drawing Sheets

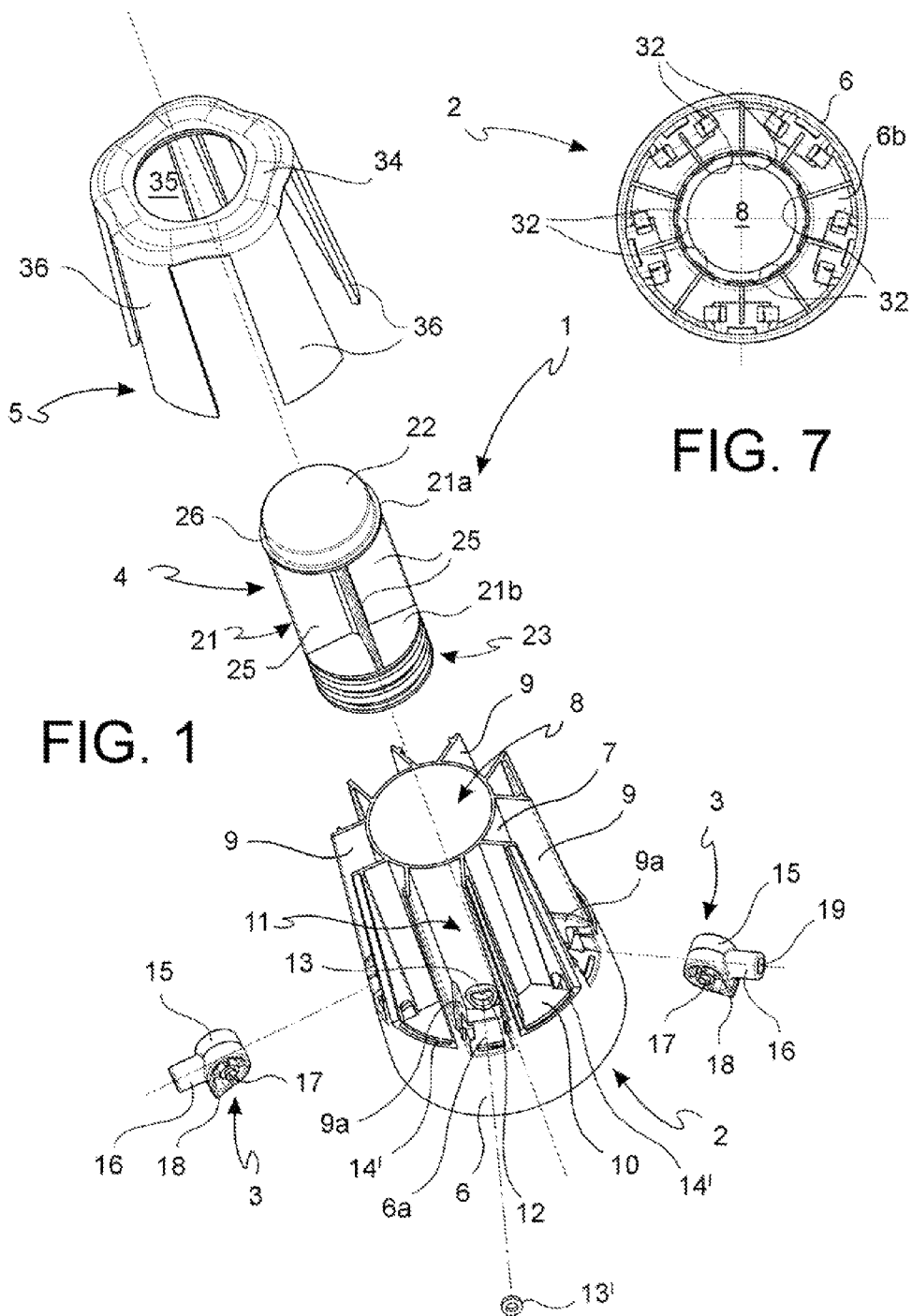

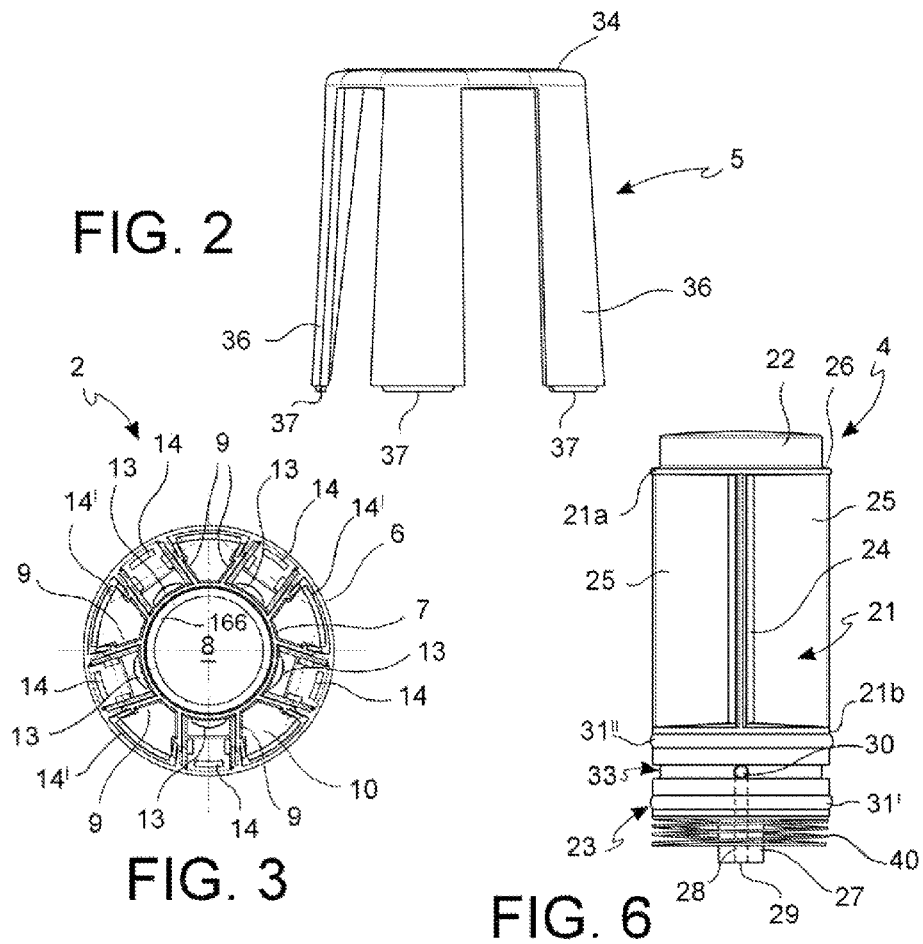
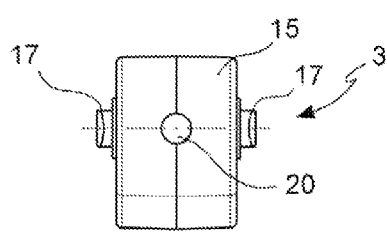
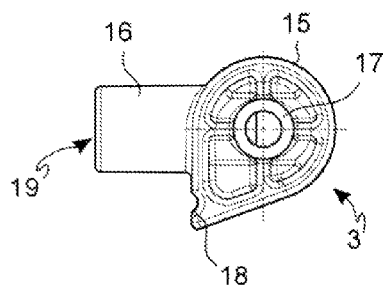

ADAPTOR FOR SPRAY CANS

CROSS REFERENCE TO RELATED APPLICATION

This application claims priority to and benefit of Italian Patent Application No. MI2012A000212 filed Feb. 15, 2012, the contents of which are incorporated by reference in their entirety.

FIELD OF THE INVENTION

The present invention relates to adaptors for spray cans.

BACKGROUND OF THE INVENTION

Precision instruments and in particular those used for medical applications need continuous and careful maintenance. For example, dental instruments, turbines and contra-angles and other types of precision instruments require lubrication of all moving parts at least daily and in any case, always before sterilisation. Such instruments are generally provided with a special aperture for the insertion of a nozzle of a spray can to introduce an appropriate lubricant.

Bearing in mind that the lubrication aperture of such instruments differs in size depending on the type and brand of the instrument, various adaptors for dispenser nozzles of lubricant sprays must be provided so as to permit sealed insertion in such lubrication aperture.

It is common practice to use just one can of liquid spray to which the relative adaptor is attached each time or to use a number of cans, each of which is coupled to a different adaptor. Both approaches have significant disadvantages.

First, given that adaptors are a relatively small size it is not infrequent for them to be accidentally mislaid.

They are also subject to wear since they are generally made from non durable material. For the same reason, repeated daily manoeuvres of attachment/detachment to/from the same spray can, may cause them to break.

In addition, the use of multiple spray cans results in increased costs associated with the purchase of several cans, one for each adaptor.

The present invention overcomes these and other drawbacks.

SUMMARY OF THE INVENTION

The present invention provides adaptors for spray cans which have a plurality of dispenser nozzles, each suitable for application to various mechanical instruments. Further characteristics and advantages of the present invention are found in the following detailed description, figures and claims.

BRIEF DESCRIPTION OF THE FIGURES

FIG. 1 shows an exploded axonometric view of an adaptor according to the invention.

FIG. 2 shows a detailed side view of the adaptor in FIG. 1.

FIG. 3 shows a detailed view from above of the adaptor in FIG. 1.

FIGS. 4 and 5, respectively, show a detailed rear and side view of the adaptor in FIG. 1.

FIG. 6 shows a detailed side view of the adaptor in FIG. 1.

FIG. 7 shows a detailed view from below of FIG. 3.

DETAILED DESCRIPTION

Figure 8:
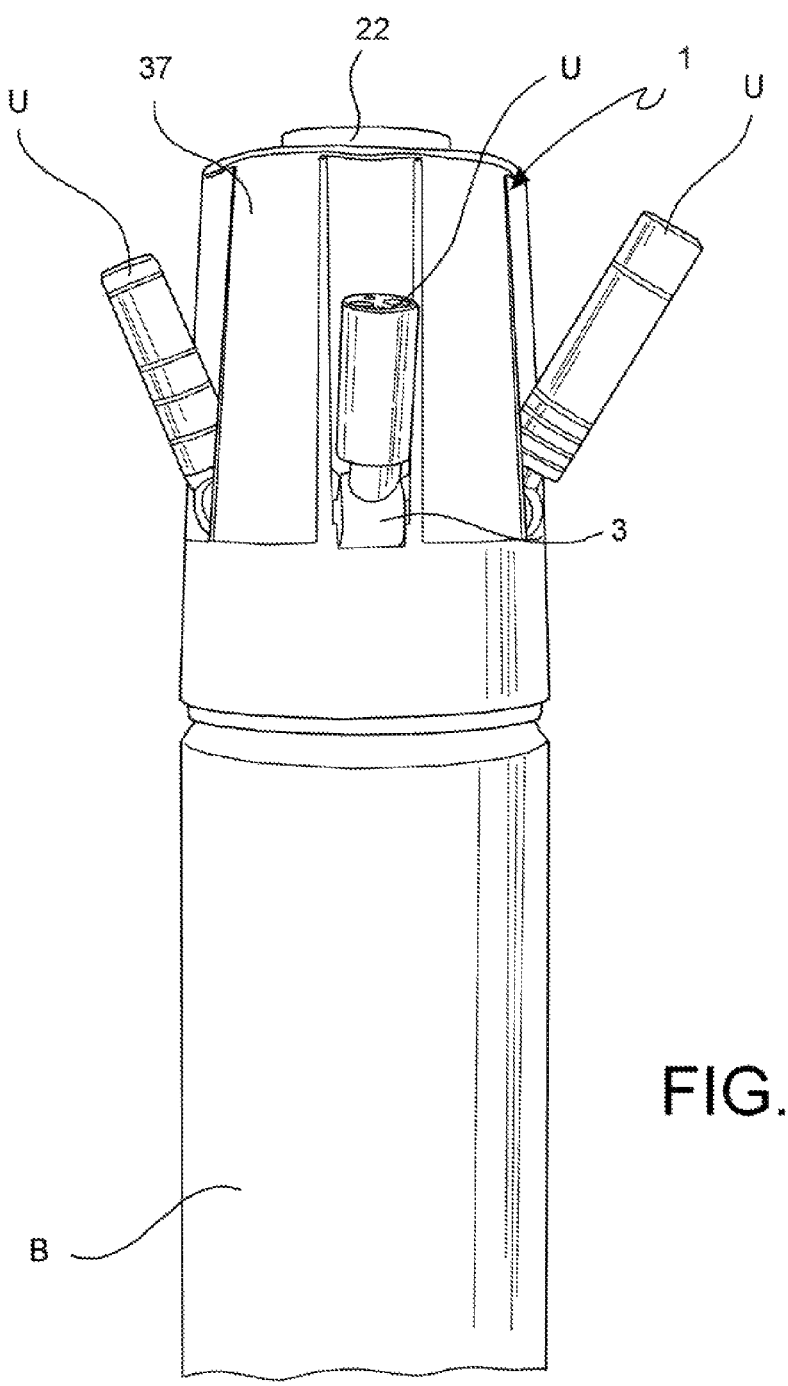
FIG. 8 shows a view of a spray can with an adaptor according to the invention, to which various types of nozzles have been attached.

With reference to FIGS. 1-7, adaptors according to the invention, globally denoted by reference numeral 1, comprises a body 2 to which a plurality of nozzle-holders 3 may be joined, an actuator 4 for operating the dispenser of a spray can (indicted by B in FIG. 8) and a closure cap 5.

The body 2 may be inscribed in a cylinder or in a truncated cone and is hollow so as to form a cylindrical channel 8 which runs longitudinally all along the body 2.

The body 2 may comprise a base portion 6 and an upper cylindrical portion 7 having a diameter less than that of the base portion 6 so as to form a shoulder 6a with it. In certain embodiments, a plurality of parallel pairs of fins spread out in a fan shape from the cylindrical portion 7. The fins 9 may extend in height all along the cylindrical portion 7 and in depth to connect to the rim of the base 6, so as to define one or more sectors 11, each positioned between a pair of parallel fins 9, alternated with two or more V-shaped sectors 10.

The sectors 11 positioned between the pairs of parallel fins 9 each may form a seat for housing a nozzle-holder 3. For such purpose, the lower portion of each sector 11 may comprises along the fins 9, two hook elements 9a. It also may have, along the rim of the shoulder 6a, a notch 14, the function of which will be clear from the description below.

The lower portion of each sector 11 further may comprise, on the surface of the cylindrical portion 7 of the body 2, a hole 12 which places the outside in communication with the cylindrical channel 8 inside the body 2. Around the hole 12 an annular seat 13 may be placed for a gasket 13', generally an O-ring of elastomeric material.

At the rim of each V-shape sector 10, the surface of the shoulder 6a, may comprise a notch 14', the function of which will be clear from the description below.

The base portion of the body 2 may further comprise, along the lower rim of the cylindrical channel 8, means for coupling 32 to the neck of a spray can B.

Such coupling means 32 may include a plurality of teeth suitable for snap-catching to the rim of the neck of a can. In different embodiments, however, coupling means 32 may consist of a magnetic ring suitable for magnetically coupling to said rim of the can, such as those made with ferrous material.

The nozzle-holder 3 may comprise a coupling portion 15 to the hook elements 9a joined to the parallel fins 9 and a connector portion 16.

The coupling portion 15 may have a substantially cylindrical shape and comprise, at the two sides, two pins 17 for coupling to hook elements 9a.

The coupling portion 15 may further comprise a tooth 18, which extends from the cylindrical surface of the coupling portion 15, such tooth 18 being adapted to facilitate the lowering of the nozzle-holder 3 from the closed to the operating position—constituting a gripping surface for the finger of a user—and to sustain and stop the nozzle-holder 3 at 90° from the vertical when in the operating position.

The connector portion 16 may have a substantially cylindrical shape and extend starting from the cylindrical surface of the coupling portion 15, in an adjacent position to the tooth 18.

Figure 12:
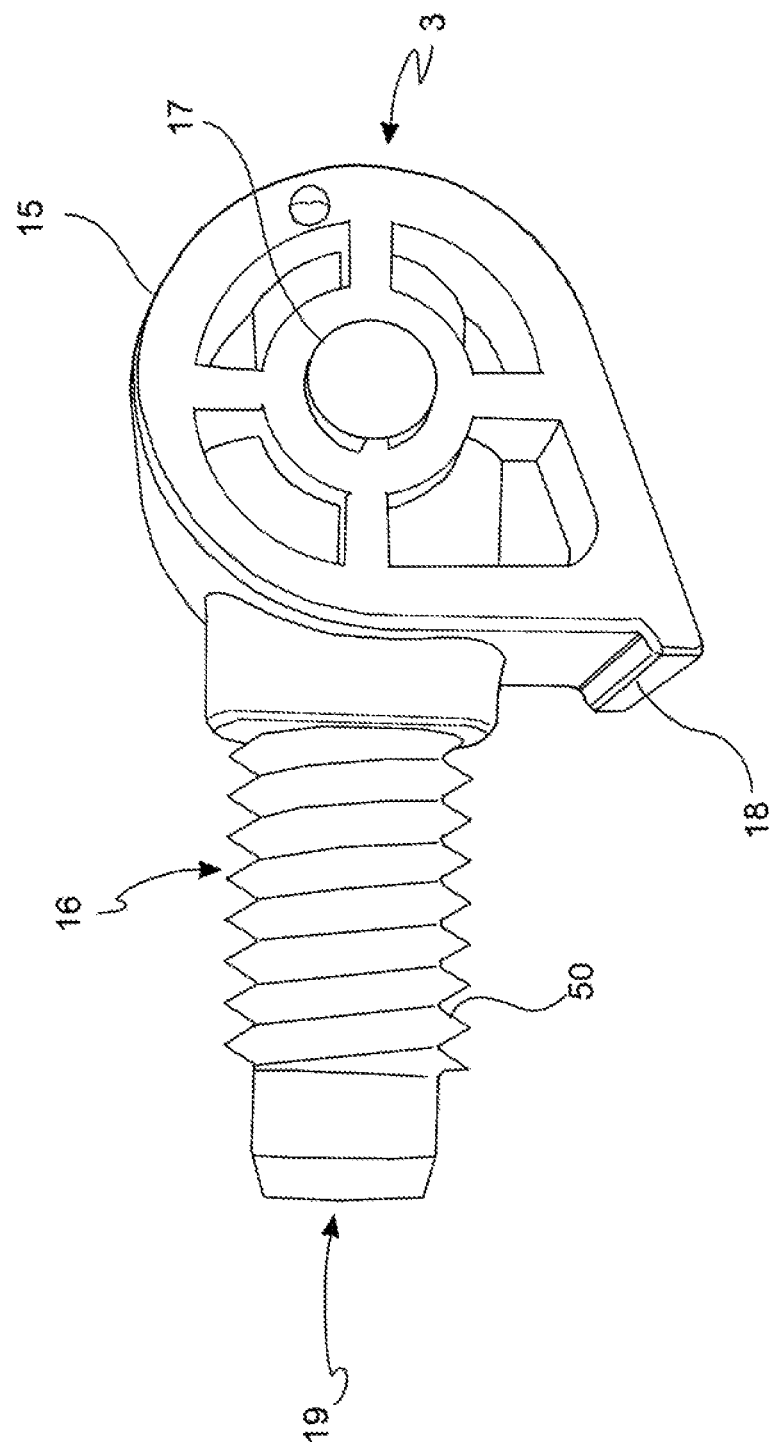
FIG. 12 shows a detailed side view of FIG. 5.

In certain embodiments, such as that shown in FIG. 12, the connector portion 16 comprises a threading 50 for a stable coupling with a nozzle U, in turn fitted with a complementary threading on its inner surface.

The nozzle-holder 3 may be hollow and comprise internally a channel which connects the aperture 19 of the connector portion 16 to a hole 20 positioned on the coupling portion in alignment with said aperture 19.

In certain embodiments, when the nozzle-holder 3 is fitted inside a respective seat between two parallel fins 9, in a condition in which the pins 17 couple to the coupling elements 9a and the tooth 18 rests on the shoulder 6a, the hole 20 of the nozzle-holder—and therefore also the respective inner channel communicating with the aperture 19 facing outward—aligns with the hole 12 present on the cylindrical portion 7 of the body 2 so as to seal it. This way the cylindrical channel 8 of the body 2 is in flow communication with the outside and the adaptor 1 according to the invention is placed in an operating condition.

Vice versa, if the nozzle-holder 3 is made to rotate so that the connector portion 16 is facing upwards, the hole 12 of the body 2 and the hole 20 of the nozzle-holder become misaligned, interrupting the flow communication between the inside and the outside of the body 2. In this rest condition, the gasket 13' ensures a seal against the cylindrical surface of the coupling portion 15 of the nozzle-holder 3 at all times, while the connector portion 16 is enclosed between the fins 9, minimising obstruction. In this condition, the notch 14 acts as a drainage channel and ensures the outflow of residual lubricant oil inside the nozzle-holder 3 and in the nozzle U (lubricant oil which remains inside the nozzle-holder after dispensing) downwards. In certain embodiments, the lower side of the base portion 6, that is the side opposite the shoulder 6a, may house a ring of absorbent material (not shown), such as a ring of foam rubber, felt or other material, which function to absorb lubricant oil dripping from the nozzle-holder 3 after each use.

This way a single nozzle-holder 3 or more than one may be set in an operating condition, leaving the others in the rest position.

The actuator 4 may have an outer diameter so it can slide inside the cylindrical channel 8 of the body 2.

The actuator 4 may comprise a central portion 21, which in turn may comprise a button portion 22 at one end and a distal portion 23 at the opposite end.

In certain embodiments the central portion 21 may be substantially contained within a cylinder and may comprise two end discs 21a, 21b connected by a central stem 24 and by ribs 25 (four in the drawing) which may extend from the stem 24 to the perimeter of the two end discs 21a, 21b. This structure makes it possible to lighten the central portion 21, saving material, without jeopardising the rigidity and strength of the structure.

The button portion 22, also may have a substantially cylindrical shape with a smaller diameter than that of the end disc 21a it is joined to, so as to form a recessed rim 26.

The distal portion 23 may extend from the lower terminal disc 21b with a slightly smaller diameter than that of the disc 21b and may end in a beak 27.

The distal portion 23 may comprise a duct 28 which ends underneath in beak 27 with an engagement aperture 29 with the nozzle of the can B. The duct 28 may end at the opposite end with an orifice 30 positioned on the cylindrical surface of the distal portion 23.

On the cylindrical surface of the distal portion 23 two gaskets 31', 31" may be positioned, longitudinally distanced to enclose between them the orifice 30 and to interfere with the surface of the cylindrical channel 8 so as to seal it. An annular channel 33 may be formed between the two gaskets 31', 31". The gaskets 31', 31" may be, for example, O-rings of elastomeric material.

Orifice 30 may be positioned at a distance from the aperture 29 such that, when actuator 4 is inserted in cylindrical channel 8 of body 2 and is pressed to operate the spray can, annular channel 33 will be level with apertures 12 of the various sectors 11.

A spring 40, such as, for example, a helical spring, which presses on one side on the lower surface of the distal portion 23 and on the other on the upper surface of the inner rim 166 of the body 2 may be positioned around beak 27.

Figure 9:
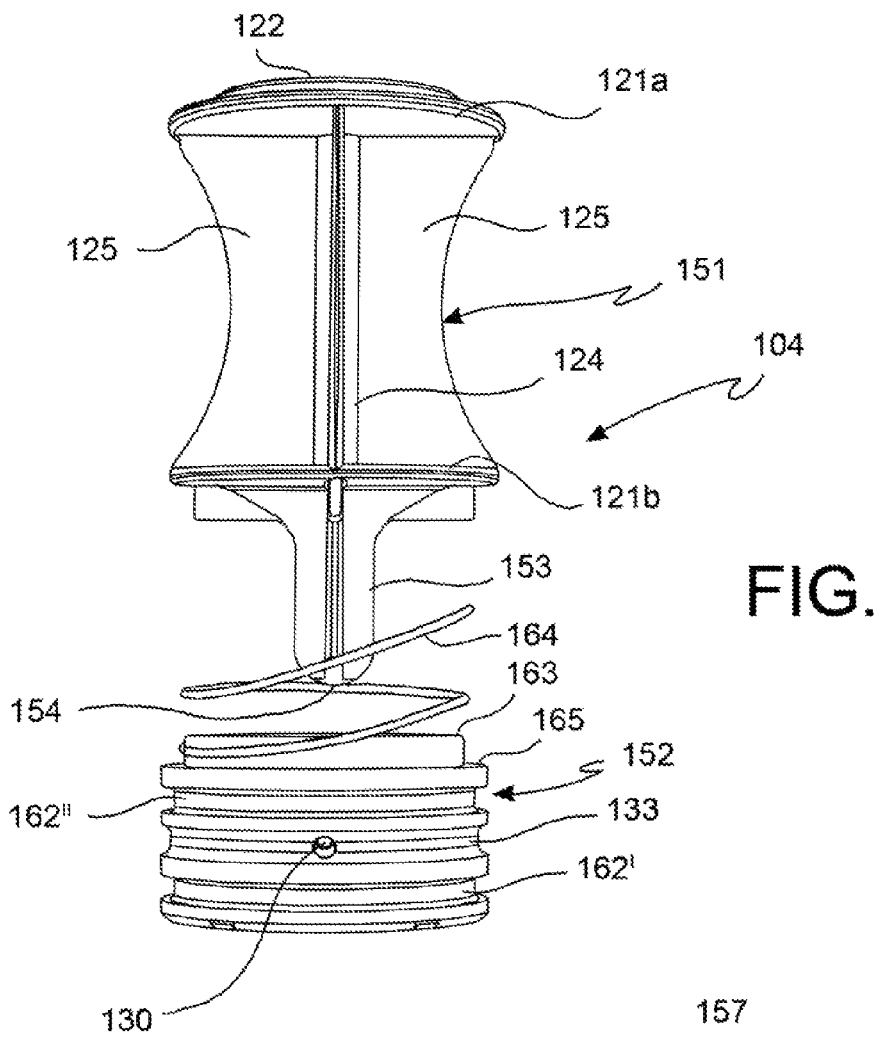
FIG. 9 shows a detailed exploded side view of an adaptor according to the invention.
Figure 10:
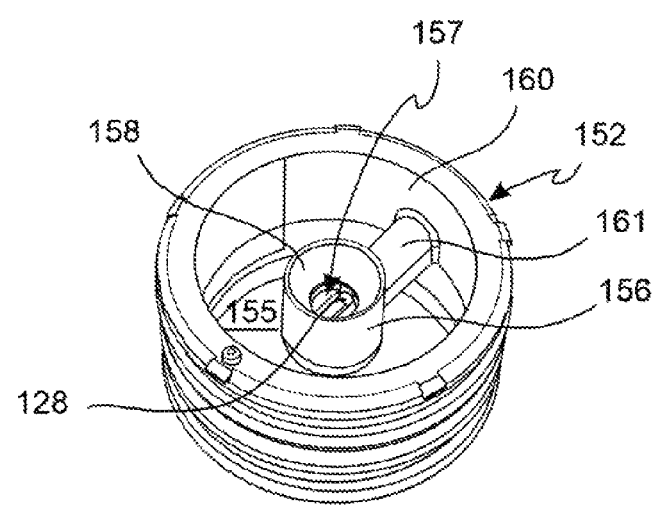
FIG. 10 shows a detailed perspective view from below of FIG. 9.
Figure 11:
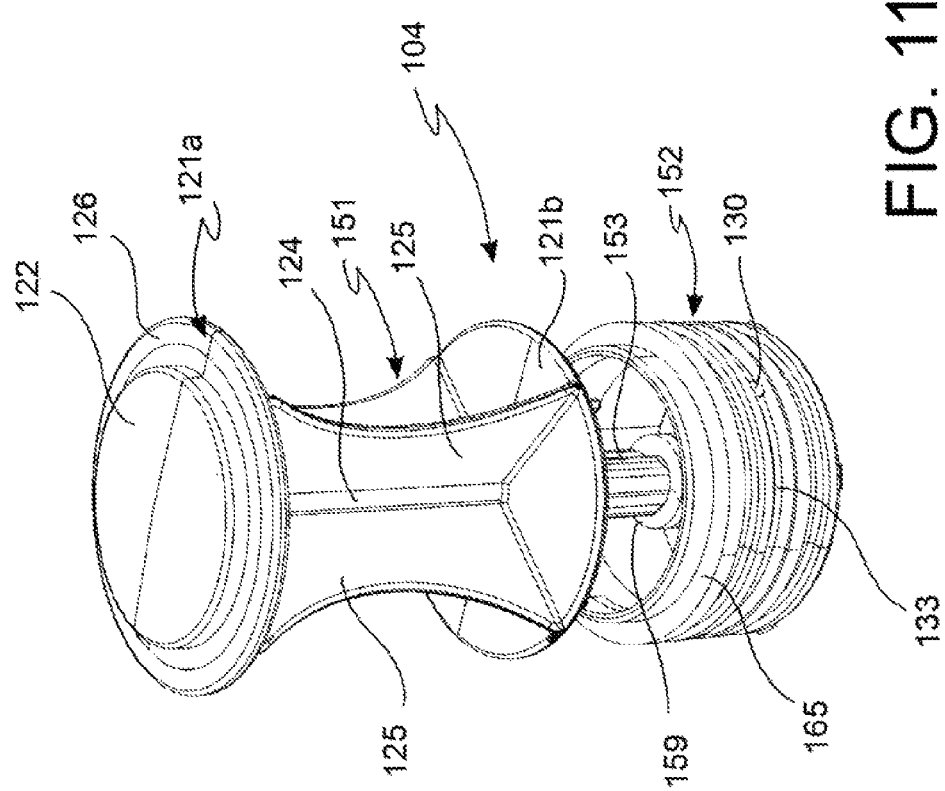
FIG. 11 shows a detailed perspective view of FIG. 9.

As shown in FIGS. 9, 10 and 11, in certain embodiments the actuator 104 may comprise two separate parts, that is a mobile pusher 151 and a fixed dispenser connector 152. Both have an outer diameter so it can slide inside the cylindrical channel 8 of the body 2.

In certain embodiments the pusher 151 may be substantially contained within a cylinder and may comprise two end discs 121a, 121b connected by a central stem 124 and by ribs 125 (four in the drawing) which may extend from the stem 124 to the perimeter of the two end discs 121a, 121b.

A button portion 122 may be positioned above the upper end disc 121a. The button portion 122, may have a substantially cylindrical shape, and have a smaller diameter than that of the end disc 121a it is joined to, so as to form a recessed rim 126.

The central stem 124 may extend, under the lower end disc 121b, to form a thrust finger 153, the lower end 154 of which may have a convex shape.

The dispenser connector 152 may be slightly smaller in diameter than end disc 121b and may have a cylindrical shape with an inner cavity 155, open at both ends.

A connector element 156 for engaging with the nozzle of can B may be positioned in a central position inside the cavity 155. For this purpose, the connector element 156 may comprise an aperture 157 on the side facing downward, in which the nozzle of the can B may be inserted. The aperture 157 may be surrounded by a flared rim 158.

On the opposite side, facing upward, the connector element 156 may have a closed surface 159. The pusher 151 may press on such closed surface 159. For this to purpose, the surface 159 may be concave, so as to achieve a shaped coupling with the convex surface of the lower end 154 of the pusher 151.

In other embodiments both the lower end 154 of the pusher 151 and the closed surface 159 of the connector element 156 may be configured differently, for example by having flat surfaces.

The connector element 156 may be connected to the inner cylindrical surface 160 of the dispenser connector 152 by a peduncle 161.

Inside the peduncle 161 a duct 128 which may originate from the aperture 157 of the connector element 156 and may end at the opposite end with an orifice 130 positioned on the outer cylindrical surface of the dispenser connector 152 may be housed.

Annular grooves 162', 162" may be positioned on the cylindrical outer surface of the dispenser connector 152, the grooves housing two gaskets (not shown), longitudinally distanced so as to enclose between them orifice 130 and to interfere with the surface of the cylindrical channel 8 so as to seal it. The gaskets may be, for example, O-rings of elastomeric material. The orifice 130 may be in turn positioned on the bottom of an annular groove 133.

Annular groove 133 which houses orifice 130 may be positioned level with the apertures 12 of the various sectors 11, so that, when the device is actuated, the lubricant liquid vaporised by the can B may pass through duct 128 and to the orifice 130 and may be dispensed through the selected nozzle-holder 3.

The upper rim 163 of the dispenser connector 152 may be configured in such a way as to form an abutment surface for pusher 151, thereby limiting its downward stroke. It should be noted that excessive pressure could damage or break peduncle 161.

Dispenser connector 152 and/or peduncle 161 may be made in a sufficiently flexible material to permit the flexion of the peduncle when the pressure of a finger is applied to the button portion 122 of pusher 151. For example, the dispenser connector 152 may be made of plastic material such as polypropylene.

Elastic means 164, such as a spiral spring or similar device, may be positioned between the pusher 151 and the dispenser connector 152 to permit the upward return of the pusher 151. The elastic means 164 may press on a shoulder 165 positioned at the bottom of the upper rim 163 of the dispenser connector 152 and on the lower surface of the pusher 151.

The closure cap 5 may comprise an upper portion 34, from the perimeter of which a plurality of tabs 36 may extend downward. Each tab 36 may terminate at the bottom with a tooth 37 of such a size and shape that it may be inserted in a notch 14' which may be present in each of the V-shaped sectors 10 of body 2. The space separating one tab 36 from that adjacent to it may correspond to the extension in width of a sector 11 of the body 2.

The upper portion 34 of the closure cap 5 may have a central hole 35 of such diameter as to permit the introduction of the button portion 22, 122 of the actuator 4 which may function as a stop for the recessed rim 26, 126.

The adaptor 1 may be assembled by introducing the actuator 4 inside the cylindrical channel 8 of the body 2 and positioning above it the closure cap 5 until the teeth 37 snap into the respective notches 14'. As shown in FIGS. 9-11, the actuator 4 may be in turn assembled by first introducing the dispenser connector 152 in the cylindrical channel 8 until it abuts with the inner rim 166 (see FIG. 3) of the body 2. The elastic means 164 may be then positioned and lastly the pusher 151 may be introduced.

The cap 5 may be attached to the body 2 by chemical (glues) or mechanical means (such as ultrasound soldering, for example). In this way, the closure cap 5 can press upward against the recessed rim 26, 126 of the actuator 4, preventing it from being extracted from above. Before or after such operation, the nozzle-holder 3 may be fitted in the respective seats of sector 11 as described above.

The adaptor 1 may function as follows:

The adaptor 1 may be fitted onto a can B (see FIG. 8) in such a way that the coupling means 32 lock it to the neck of the can. In this position beak 27 or, in the embodiment shown in FIGS. 9-11, the connector element 156 of the actuator 4, may be joined to the dispenser nozzle of the can (not shown) without exerting a dispensing pressure on it. To dispense the spray, the button portion 22, 122 of the actuator 4 must be pressed. The return of the actuator 4 to the rest position is ensured by the same dispenser nozzle of the can and by the spring 40 or by elastic means 164.

To dispense the spray from one of the nozzle-holders, the nozzle-holder 3 should be placed in the operating condition (i.e., in a position in which the connector portion 16 is horizontal and the hole 20 of the coupling portion 15 is aligned with the hole 12 of the body 2). In this condition, when the actuator 4 is pressed to dispense the spray, the fluid may pass through the duct 28, 128 and the orifice 30, 130 until it reaches the annular channel 33,133, from which it passes into the nozzle-holder 3 which is positioned in an operative condition. The gaskets 31', 31" or, in the embodiments shown in FIGS. 9-11, the gaskets housed in the annular grooves 162', 162", may prevent the exit of the fluid from the annular channel 33, 133 while the gaskets 13 of the other non-selected holes 12 prevent the exit of fluid outward.

As shown in FIG. 8, on each nozzle-holder 3 a nozzle U may be fitted suitable for various devices.

In one embodiment, the various nozzles U may be different colours, so as to facilitate the selection of the nozzle U suitable for the specific instrument to be lubricated.

The advantages of the invention are evident.

For example, with a single adaptor positioned on a single spray can it is possible to select various types of nozzles for dispensing the fluid, typically a lubricant, in different models and brands of instrument. Such nozzles may be pre-fitted to respective nozzle-holders 3, thereby saving time and cost to the user. The user thus will not need to have many cans available, each with a different nozzle, nor will the user have to attach and detach different nozzles to the same can as required.

Adaptors according to the invention may be made in plastic with a consequent low production cost.

The need to detach the adaptor only when the can is empty also reduces the risk of accidental breakage of the device.

In the embodiments shown in FIGS. 9-11, because the dispenser connector 152 is fixed and only the pusher 151 is mobile considerably reduces the amount of pressure necessary to be applied to the button portion 122 to dispense the lubricant. In addition, the gaskets present on the outer surface of the dispenser connector 152 prevent it from sliding.

The description above refers to only particular embodiments of the present invention, to which a person skilled in the art may make modifications for its adaptation to particular conditions while remaining within the scope of protection claimed.

For example, although the adaptor according to the invention has been designed in particular for use in lubricating dental instruments, it is clear that it may also be applied to all sorts of mechanical instruments which require this type of maintenance, as indeed to any other use in which the introduction of a vaporised fluid from a spray can by means of a predefined connector is useful.

The invention claimed is:

1. An adaptor for spray cans having a neck, the adaptor comprising a body adapted for positioning on the neck of a spray can, and an actuator for operating a dispenser nozzle of the spray can, wherein the body comprises a cylindrical channel, said actuator being insertable so as to slide in the cylindrical channel, and wherein said adaptor also comprises a plurality of nozzle-holders, each of which is suitable for being joined to a nozzle for dispensing to a mechanical instrument, the adaptor further comprising a movable pusher and a fixed dispenser connector, the dispenser connector having an inner cylindrical surface, an outer cylindrical surface and a connector element for engaging with the nozzle of the spray can, the connector element comprising an aperture on a side facing downward, in which the nozzle of the can may be inserted, and a closed surface positioned on an opposite side, facing upward, said closed surface being adapted for interfering with the pusher, wherein the connector element is connected to the inner cylindrical surface of the dispenser connector by a peduncle, said peduncle being flexible so as to permit its flexion by finger pressure applied to the pusher, and wherein inside the peduncle a duct which originates from the aperture of the connector element and ends at an opposite end with an orifice positioned on the outer cylindrical surface of the dispenser connector is housed.

2. The adaptor of claim 1, wherein the body comprises a base portion and an upper cylindrical portion having a diameter less than that of the base portion so as to form a shoulder, and wherein a plurality of parallel pairs of fins spread out in a fan shape from a cylindrical portion defining between them two or more sectors, each of said sectors forming a seat for housing a nozzle-holder of the plurality of nozzle-holders.

3. The adaptor of claim 2, wherein a lower portion of each sector comprises, along fins of the plurality of parallel pairs, two hook elements and presents a notch along a rim of the shoulder, each sector further comprising, on a surface of the cylindrical portion of the body, a hole which places it in communication with the cylindrical channel inside the body, a gasket being placed around the hole.

4. The adaptor of claim 1, wherein a base portion of the body comprises, along a lower rim of the cylindrical channel, coupling means to the neck of the spray can.

5. The adaptor of claim 4, wherein said coupling means are magnetic.

6. The adaptor of claim 1, wherein each nozzle-holder of the plurality of nozzle-holders comprises a coupling portion to the body and a connector portion to a nozzle, wherein the coupling portion has a substantially cylindrical shape and comprises, at two sides, two pins adapted for coupling to hook elements of the body, the coupling portion further comprising a tooth for facilitating the lowering of the nozzle-holder of the plurality of nozzle-holders from a closed position to an operating position and for positioning the nozzle-holder at about 90° from vertical when it is in the operating position resting on a surface of the shoulder of the corresponding sector, and wherein the connector portion extends starting from a cylindrical surface of the coupling portion, in an adjacent position to the tooth.

7. The adaptor of claim 6, wherein the connection connector portion of the nozzle-holder of the plurality of nozzle-holders comprises a threading for a stable coupling with a nozzle, wherein said nozzle is in turn fitted with a complementary threading on its inner surface.

8. The adaptor of claim 1, wherein the nozzle-holder of the plurality of nozzle-holders comprises a channel which connects an aperture of the connector portion to a hole positioned on the coupling portion in alignment with said aperture, wherein, when the nozzle-holder of the plurality of nozzle-holders is in an operative condition, a hole of the nozzle-holder of the plurality of nozzle-holders aligns with a hole on the cylindrical portion of the body so as to seal it, and conversely wherein, when the nozzle-holder of the plurality of nozzle-holders is in a rest condition, a hole of the body and the hole of the nozzle-holder of the plurality of nozzle-holders are misaligned and a gasket ensures a seal against a cylindrical surface of the coupling portion of the nozzle-holder of the plurality of nozzle-holders.

9. The adaptor of claim 1, wherein the actuator comprises a central portion, which in turn comprises a button portion at one end and at the opposite end a distal portion, said distal portion ending with a beak and comprising a duct which ends underneath the beak with an engagement aperture with the dispensing nozzle of the spray can and at the opposite end with an orifice positioned on the cylindrical surface of the distal portion.

10. The adaptor of claim 9, wherein two gaskets are positioned on the cylindrical surface of the distal portion, the said gaskets enclosing therebetween the orifice to interfere with the surface of the cylindrical channel so as to seal it, an annular channel being formed between the two gaskets.

11. The adaptor of claim 9, wherein the central portion comprises two end discs connected by a central stem and by ribs which extend from the central stem to the perimeter of the two end discs.

12. The adaptor of claim 1, wherein the pusher comprises two end discs connected by a central stem and by ribs which extend starting from the central stem, wherein the central stem extends, under a lower end disc, to form a thrust finger.

13. The adaptor of claim 1, further comprising annular grooves, wherein said annular grooves having comprise two gaskets positioned on a cylindrical outer surface of the dispenser connector, said annular grooves being longitudinally spaced apart so as to enclose an orifice therebetween.

14. The adaptor of claim 1, wherein, between the pusher and the dispenser, connector elastic means are positioned.

* * * * *